United States Patent [19]

Brenan et al.

[11] 3,974,954

[45] Aug. 17, 1976

[54] APPARATUS FOR MAKING TINED ELECTRICAL CONTACTS

[75] Inventors: Robert R. Brenan, Warren, Pa.; Gordon L. Johnson, Jamestown, N.Y.

[73] Assignee: GTE Sylvania Incorporated, Stamford, Conn.

[22] Filed: Jan. 17, 1975

[21] Appl. No.: 541,853

Related U.S. Application Data

[62] Division of Ser. No. 450,571, March 13, 1974, abandoned.

[52] U.S. Cl. ................................. 228/13; 228/18; 219/79
[51] Int. Cl.² ........................................ B23K 31/00
[58] Field of Search ..................... 29/630 C, 630 R; 228/13, 18; 219/79

[56] References Cited

UNITED STATES PATENTS

| | | | |
|---|---|---|---|
| 1,806,188 | 5/1931 | Adams | 29/630 C |
| 2,252,899 | 8/1941 | Reynolds | 29/630 C |
| 2,275,438 | 3/1942 | Hothersall | 29/630 C UX |
| 2,307,579 | 1/1943 | Fluke | 228/18 X |
| 2,477,894 | 8/1949 | Pityo et al. | 219/79 |
| 3,299,246 | 1/1967 | Wahl | 219/79 |
| 3,499,211 | 3/1970 | Dubuc | 29/630 R UX |
| 3,537,162 | 11/1970 | Kochan | 29/630 C |
| 3,568,301 | 3/1971 | Shibata | 29/630 C X |

*Primary Examiner*—Al Lawrence Smith
*Assistant Examiner*—K. J. Ramsey
*Attorney, Agent, or Firm*—Norman J. O'Malley; Lawrence R. Fraley; Donald R. Castle

[57] ABSTRACT

There is disclosed an electrical contact and a method and apparatus for making said electrical contact wherein the contact comprises at least one formed tine portion, a central retaining portion, and a tail portion. Secured to this tine portion is a precious metal contact material comprised of a first layer of a base material and a second layer of a precious metal.

10 Claims, 10 Drawing Figures

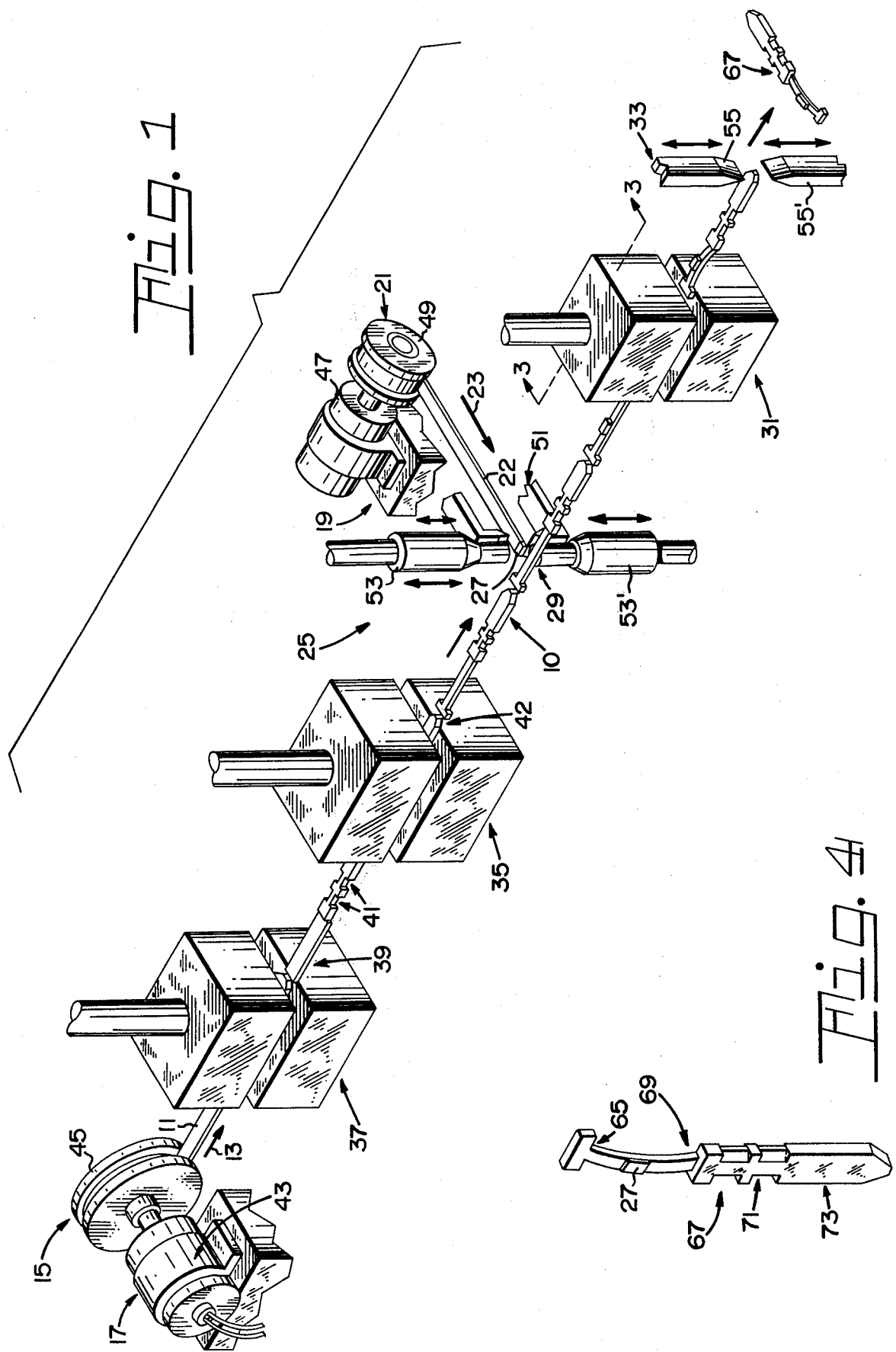

ly detailed description when read in conjunction with the accompanying drawings.

APPARATUS FOR MAKING TINED ELECTRICAL CONTACTS

CROSS REFERENCE TO RELATED APPLICATION

This application is a division of Ser. No. 450,571, filed Mar. 13, 1974, now abandoned.

BACKGROUND OF THE INVENTION

This invention relates to the manufacture of electrical contacts and more particularly to the manufacture of electrical contacts having precious metal contacting areas.

Even more particularly this invention relates to manufacturing electrical contacts to be positioned within an electrically insulative housing.

Contacts of the type described above are extensively used in the electronics industry to perform a variety of functions such as electrically connecting a printed circuit board to a plurality of corresponding circuits. In this particular arrangement a single circuit board is positioned in an insulative housing. In doing so, the conducting areas on the board mate with corresponding contacting areas on the electrical contacts also positioned in the housing. Accordingly, the respective tail portions of each contact have joined thereto a lead from an externally located circuit. Such a lead is secured to the tail by utilizing well established techniques such as wire-wrapping or welding.

Previously known contacts having precious metal contacting areas have been manufactured utilizing methods and apparatus which position the precious metal, usually in the form of a gold or silver composition wire, upon the designed area on the contact and thereafter subject this area to either a cold or hot forming operation. Welding has been successfully used to secure the precious metal to the contact but this method has usually required feeding the precious metal in the form of a wire vertically downward to the horizontally positioned flat surface of the contact. When contact is achieved, electrical current is applied and the weld occurs. Such a method is disclosed in U.S. Pat. No. 3,114,828 which is assigned to the same assignee as is the present invention. While both this and similar methods successfully produced a contact with precious metal contacting areas it can readily be seen that highly accurate control measures are required to control the amount of precious metal wire used during the welding sequence. On some occasions, excessive precious metal was wasted as a result of minor fluctuations in either the rate of feed of the wire or in the current densities applied. In those operations not utilizing welding as the attaching medium, the problems on several occasions have centered about inadequately achieved bonds between the contact surfaces and the precious metal. This particular problem is further amplified with repeated insertions of the printed circuit board into the connector housing.

OBJECTS AND SUMMARY OF THE INVENTION

It is therefore a primary objective of this invention to enhance the manufacture of electrical contacts having precious metal contacting areas.

It is another object of this invention to provide a new and unique electrical contact having a precious metal contacting portion secured thereto which comprises a base material and a precious metal.

It is still another object of this invention to provide a method for making the described electrical contact.

Yet another object of this invention is the provision of an apparatus for making electrical contacts having precious metal contacting area. contact In accordance with one aspect of the present invention, there is described an electrical contact which comprises a contacting portion having at least one tine, a central retaining portion substantially adjacent the contacting portion, and a tail portion substantially adjacent the central retaining portion. The tine of the contacting portion has a precious metal contacting area attached thereto, this contacting area comprising a contaact material having a first layer of a base material and a second layer of a precious metal.

In accordance with another aspect of the present invention, there is described a method for making tined electrical contacts from a continuous metal strip which intermittently moves through a plurality of work stations. This method comprises advancing the strip to a first work station, positioning a preselected portion of a strip of contact material in alignment with a predetemined area on the strip, attaching this preselected portion to the strip, advancing the metal strip with the contact material attached thereto to a second work station, and cutting and forming the strip to thus provide the desired electrical contact.

In still another aspect of the present invention, there is shown an apparatus for making electrical contacts from a continuous metal strip which intermittently moves along a first path of travel. Each of the contacts include at least one tine portion which has a contacting area formed thereon from a contact material comprising a first layer of a base material on a second layer of a precious metal. The apparatus comprises a supply means for supplying the metal strip, an indexing means positioned relative to the supply means for indexing the metal strip, a positioning means for positioning a preselected portion of the contact material in alignment with a selected area on the strip, a supply means for supplying the contact material along a second path of travel, an attaching means for securing the contact material to the strip, and cutting and forming means for cutting and forming each of the electrical contacts from the metal strip.

BRIEF DESCRIPTION OF THE DRAWINGS

FIG. 1 is an isometric view of the apparatus in accordance with a preferred embodiment of the present invention;

FIG. 4 illustrates an electrical contact which may be made in accordance with this invention.

DESCRIPTION OF THE PREFERRED EMBODIMENTS

Figure 2A:
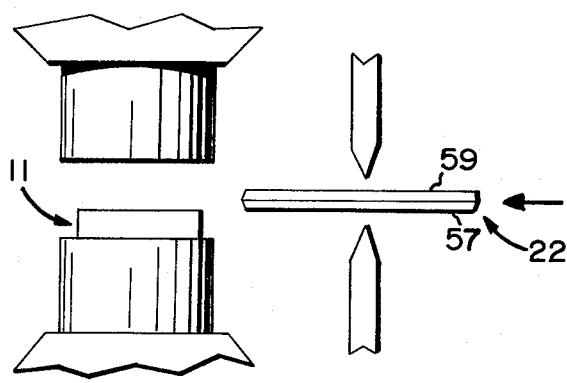
FIGS. 2A–2E illustrate the preferred method for securing the precious metal contacting material to the metal strip.

For a better understanding of the present invention together with other and further objects, advantages and capabilities thereof, reference is made to the following disclosure and appended claims in connection with the above described drawings.

With particular reference to the drawings, there is illustrated in FIG. 1 an apparatus 10 for making electrical contacts from a continuous metal strip 11 intermittently moving along a first path of travel (indicated as arrow 13). Each of the contacts produced from apparatus 10 will include at least one tine portion having a contacting area formed thereon from a contact material which comprises a first layer of a base material and a second layer of a precious metal. As shown in FIG. 1, apparatus 10 comprises a supply means 15 for supplying metal strip 11, an indexing means 17 positioned relative to the path of travel of strip 11, a supply means 21 for supplying contact material 22 along a second path of travel (indicated as arrow 23), and an attaching means 25 positioned relative to positioning means 19 for attaching a preselected portion 27 of contact material 22 to a corresponding predetermined area 29 on strip 11. Apparatus 10 further includes a forming means 31 positioned relative to attaching means 25 for forming each of the electrical contacts manufactured from strip 11 to a desired configuration, and a cutting means 33 positioned relative to forming means 31 for subsequently cutting each of the formed contacts from the metal strip.

Although not considered essential components to the preferred embodiment of the apparatus of the invention, apparatus 10 may also include a removal means 35 and a coining means 37. Coining means 37 may be utilized to provide each of the desired contacts to be formed from strip 11 with a flattened area 39 and a plurality in extending members 41. Each of these extending members may be used in the final contact assembly for assisting in the frictional positioning of the contact within an electrically insulative housing. Flattened area 39 may then have selected areas removed therefrom upon passing through removal means 35. Another portion of the unflattened area on the strip may also be subjected to having selected areas removed therefrom, such as to provide an indented tip area 42. Tip area 42 eventually provides the end of the tail portion of the finished contact. As stated, both removal means 35 and coining means 37 are not considered essential to the present invention in that a contact can readily be manufactured from a singular strip not subjected to these described operations. However, each of these components are preferably utilized in the present invention to provide a finished contact with the described corresponding indentations and removals.

As can be seen in FIG. 1, the path of travel of metal strip 11 occupies a first plane. Accordingly, it is preferred that the path of travel of contact material 22 will occupy a second plane substantially parallel to the described plane of strip 11. It is also preferred that the path of travel of contact material 22 be substantially perpendicular although this is by no means meant to be restrictive with regard to the present invention. It can readily be seen that contact material 22 could be provided in a more oblique or angular direction and still achieve satisfactory results.

Indexing means 17, illustrated in FIG. 1 as comprising an intermittently actuated drive means 43 is drivably affixed to supply means 15. Supply means 15, as shown in FIG. 1, comprises a spool 45. In like manner, positioning means 19 for positioning contact material 22 comprises an intermittently actuated drive means 47 drivably affixed to supply means 21. As similar to supply means 15, supply means 21 comprises a spool member 49. Each of the described drive means 43 and 47 may comprise an electric motor which is intermittently electrically actuated in accordance with the desired sequence of operation of apparatus 10. Such actuation is readily achieved by the utilization of an electrical circuit designed in accordance with the operating procedure described. The design of such an electrical circuit could be readily achieved once the operation of apparatus 10 was known and henceforth further description of this circuit is not considered necessary.

In the preferred embodiment, positioning means 19 further includes a notching means 51 for sequentially notching contact material 22 to thereby define the preselected portion 27 on the material. This described notching operation occurs prior to attaching portion 27 to the predetermined area 29 on the soon-to-be produced contact. Notching means 51 could be readily actuated by a pair of corresponding hydraulically actuated cylinder members (not shown) or similar type devices and henceforth description is not considered essential. The full sequence of operation of attaching predetermined portion 27 to area 29, to include the notching sequence, will be given with the description of FIGS. 2A–2E.

As illustrated in FIG. 1, attaching means 25 preferably comprises a welding assembly which includes a pair of opposed electrodes 53 and 53'. Electrode 53, positioned above preselected portion 27 and strip 11, is adapted for engaging selected portion 27 while second electrode 53' is adapted for engaging the strip 11 which passes thereover. As can be appreciated, both electrodes 53 and 53' could readily be adaptable for moving to engage the corresponding components described. However, in the preferred embodiment lower electrode 53' is stationery while upper electrode 53 is adapted for movably engaging portion 27.

The operation of formings means 31 will be described with the description of FIGS. 3A and 3B. As shown in FIG. 1, cutting means 33 is illustratively represented as a pair of opposed cutting members 55 and 55' which are adapted for moving and sequentially cutting strip 11 to provide the desired length of each of the contacts to be produced. Although illustrated as a separate component, it can be readily understood that cutting means 33 could form an integral portion of forming means 31 with both operations being performed by the same component.

FIGS. 2A–2E illustrate the steps of the preferred method for securing the precious metal contacting material to the metal strip 11. In FIG. 2A, the precious metal contacting material 22 is supplied in the direction indicated from supply means 21 (not shown). Contacting material 22 is preferably in the form of a tape comprising a first layer 57 of a base material and a second layer 59 of a precious metal. A preferred material for base material 57 is nickel or a copper-nickel alloy, while a preferred material for layer 59 is a gold alloy composition. Of the several gold alloy compositions available for this particular use, it is preferred to use a composition consisting essentially of from about 65 to about 80 percent by weight gold and from about 20 to about 35 percent by weight silver. When securing the described precious metal contacting material to electrical contacts having a thickness of within the range of from about 0.008 inches to about 0.080 inches, it is desired to utilize a first layer 59 having a thickness of from about 0.00025 to about 0.0025 inches and a thickness for base material 57 of from about 0.0010 inches to about 0.005 inches.

Precious metal layer 59 is bonded to base material 57 by utilizing metal working techniques of which several are well known in the industry. Such a technique preferably utilizes both pressure and temperature to secure two metallic compositions along a common interface. It has also been found that a successful bond can be achieved between layers 57 and 59 utilizing cold bonding techniques which rely mainly on pressure to achieve the desired bond. As can be appreciated, the provision of contacting material 22 in the form of a tape as described provides a contact base with a sound electrical contacting area which successfully utilizes a minimum of precious metal compositions. Such a provision results in a substantial savings in material cost as well as assures the sound electrical connection required.

Figure 2B:
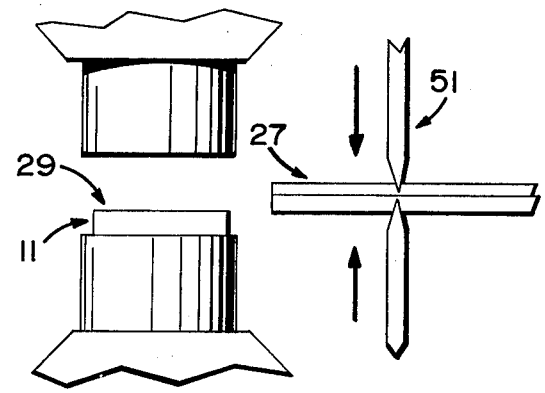

In FIG. 2B, notching means 51 is actuated to notch both layers 57 and 59 of contact material 22 to thereby define preselected portion 27 which is to be secured to the previously described predetermined area 29 on metallic strip 11. As shown in FIG. 2B, both upper and lower sides of contact material 22 are notched in the manner indicated. It is to be understood however, that only one of these sides may receive a notch or similar indentation therein and still provide the desired results as will be explained.

Figure 2C:
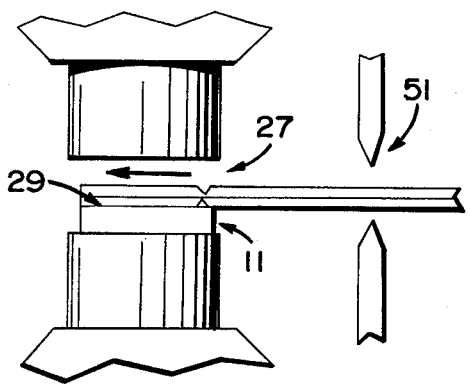
Figure 2D:
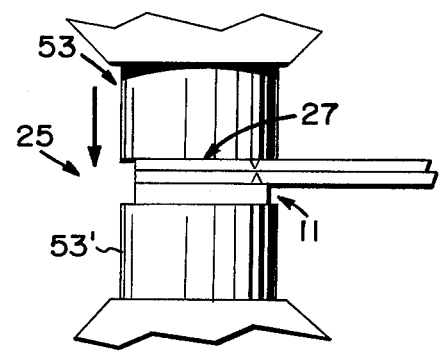
Figure 2E:
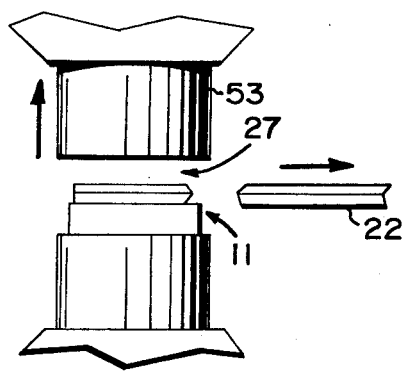

As shown in FIG. 2C, contact material 22 having been notched is further supplied in the direction indicated whereby preselected portion 27 aligns above and is positioned on predetermined area 29 of strip 11. Upper electrode 53 is then actuated to lower and engage portion 27, as illustrated in FIG. 2D. Lower electrode 53', having strip 11 positioned thereon, thus is in engagement with the strip. With both electrodes respectively engaged as illustrated in FIG. 2D, electrical current is supplied to the attaching means and portion 27 is secured to strip 11. As shown in FIG. 2E, upper electrode 53 is then raised. Supply means 21 (not shown) is then actuated in the direction indicated to separate the remainder of contacting material 22 from the secured portion 27. This actuation, in addition to separating the described items, also provides a means for indicating whether or not a suitable attaching has been achieved between the portion 27 and the strip 11. Upon this actuation, should portion 27 not separate and remain on the remaining portion of material 22, an operator can readily ascertain that the desired attachment has not resulted. Modification can then be made to apparatus 10 to correct this situation. Such modification can incorporate an increasing of the electrical current supplied attaching means 25.

Thus, there has been shown a means whereby contacting material 22 in the form of a bilayered tape of different materials may be readily secured to a metallic strip to eventually be utilized as an electrical contact. Using a base material of the materials described, readily achieves a sound connection between the base metal and this material. Base material 57 also provides a protective means for the gold alloy composition of layer 59 in the finished product. It is preferred in the industry to use a phosphor bronze or similar type material for the base metal strip 11 which is to eventually be formed into the contact. Use of such materials has in the past presented a typical problem in that these materials have often attacked the precious metal secured thereto during the operation of the contact in an electrical circuit. The desired undesirable interaction between the two materials has often resulted in a deformation of the precious metal area. As shown, the present invention substantially minimizes this undesirable occurence.

Figure 3A:
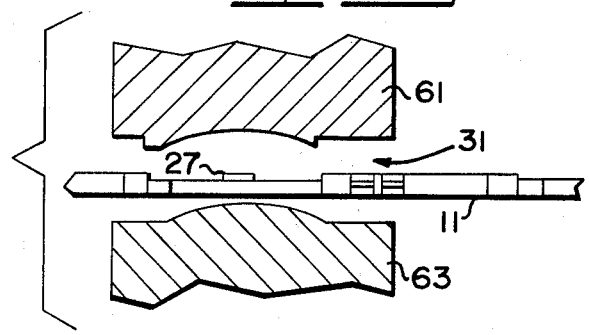
FIGS. 3A and 3B illustrate the preferred means for forming each of the electrical contacts to the desired configuration.
Figure 3B:
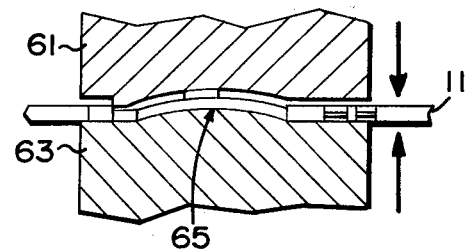

In FIGS. 3A–3B, the forming operation of the metallic contact having the precious metal contacting area secured thereto is illustrated. Forming means 31 is illustrated as comprising an upper defining member 61 and a lower base member 63. Metallic strip 11 with selected portion 27 of the precious metal contacting material attached thereto is positioned between the two members as the strip passes through apparatus 10. Members 61 and 63 are then actuated to define the tined portion, illustrated as 65 in FIG. 3B. It is preferred that the overall thickness of portion 27 as well as that of the shaped tine portion not be reduced during this operation. As explained in the description of FIG. 1 this formed portion of strip 11 is then advanced to cutting means 33 and the ultimate contact 67 severed from the strip.

In FIG. 4, an example of an electrical contact 67 as produced by apparatus 10 is shown. Contact 67 is illustrated as comprising a contacting portion 69 having at least one tine 65 with a selected portion 27 of a precious metal secured thereto. Contact 67 also comprises a central retaining portion 71 which is positioned substantially adjacent contacting portion 69 and adapted for providing the proper orientation of the contact within an electrically insulative housing. The tail portion 73 has also been provided and is positioned substantially adjacent retaining portion 71. When the contact is positioned within the described electrical insulative housing, tail portion 73 is adapted for having an electrical connection secured thereto. As described, the preferred material for contact 67 is phosphor bronze. Tine portion 65 of contact 67 is adapted for engaging the conductive surface of a printed circuit board when the circuit board is positioned within the electrical insulative housing.

Figure 5:
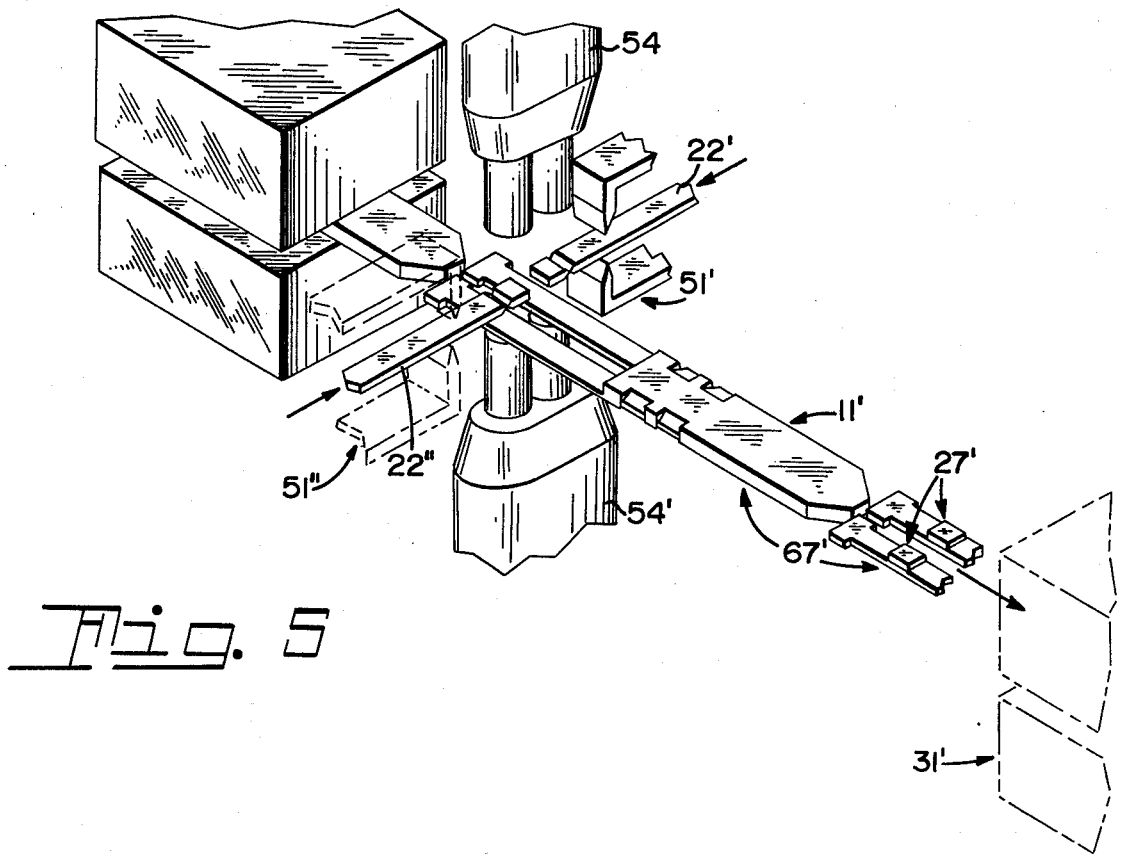
FIG. 5 illustrates an additional embodiment of an apparatus for making electrical contacts having more than one tine thereon.

In FIG. 5, an alternate embodiment of apparatus 10 is illustrated. This embodiment illustrates a means for securing a pair of precious metal contacting areas to corresponding predetermined areas on a singular metal strip 11'. To achieve this dual operation, a pair of opposingly fed precious metal contact materials 22' and 22'' are supplied. A pair of notching means 51' and 51'' (shown in phantom) are utilized to notch contacting materials 22' and 22'' respectively. Electrodes 54 and 54' provide the means for attaching these respective selected portions to the predetermined areas of the strip 11' in much the same manner as did electrodes 53 and 53' in apparatus 10. Thus it can be seen that should an electrical contact having more than one tine thereon be desired, it is only necessary to provide slight modification to apparatus 10 in order to achieve the desired results. As shown in FIG. 5, a contact 67' having two tines is easily produced with each tine having a corresponding precious metal contacting portion 27' secured thereto. After securing of these portions to the respective tines, the strip 11' is further advanced in much the same manner as was strip 11 in FIG. 1. Accordingly, the strip 11' is subsequently subjected to the forming operation as provided by forming means 31' (illustrated in phantom) following which each contact is severed from the remainder of the strip 11'.

Thus, there have been illustrated and described an electrical contact having a contacting portion which includes a tine having a precious metal contacting area attached thereto. The described precious metal contacting area comprises a contact material having a first layer of a base material and a second layer of a precious metal, the first layer in secured relationship to the tine. There has also been shown and described an apparatus and a method for producing this electrical contact.

While there have been shown and described what are at present considered the preferred embodiments of the invention, it will be obvious to those skilled in the art that various changes and modifications may be made therein without departing from the scope of the invention as defined by the appended claims.

We claim:

1. An apparatus for making electrical contacts from a continuous metal strip intermittently moving along a first path of travel, each of said contacts including at least one tine portion formed from said metal strip having a contacting portion secured thereto, said contacting portion comprising a contact material including a first layer of a base material in engagement with said tined portion and a second layer of a precious metal secured to said first layer, said apparatus comprising:

supply means for supplying said metal strip;

indexing means positioned relative to said supply means for indexing said metal strip to provide said intermittent motion;

supply means for supplying said contact material along a second path of travel;

positioning means positioned relative to said path of travel of said metal strip for positioning a preselected portion of said contact material in mutual alignment with a predetermined area on said strip and for withdrawing the remainder of said contact material in a direction along said second path of travel and away from said preselected portion to separate said preselected portion therefrom;

notching means included within said positioning means for sequentially notching said contact material to define said preselected portion;

welding means positioned relative to said positioning means for welding said preselected portion of said contact material to said predetermined area on said strip after said preselected portion has been defined by said notching means and before said remainder of said contact material has been withdrawn from said preselected portion and separated therefrom whereby said layer of base material will be engagement with said metal strip;

forming means positioned relative to said welding means for forming each of said electrical contacts to a desired configuration without reducing the thickness of said preselected portions of said contact material welded to said predetermined areas on said strip; and cutting means positioned relative to said forming means for cutting each of said formed contacts from said metal strip.

2. The apparatus according to claim 1 wherein said path of travel of said metal strip occupies a first plane and said path of travel of said contact material occupies a second plane, said first plane substantially parallel to said second plane.

3. The apparatus according to claim 2 wherein said path of travel of said metal strip is substantially perpendicular to said path of travel of said contact material.

4. The apparatus according to claim 1 wherein said path of travel of said metal strip is substantially perpendicular to said path of travel of said contact material.

5. The apparatus according to claim 1 wherein said indexing means comprises an intermittently actuated drive means drivably affixed to said supply means for supplying said metal strip.

6. The apparatus according to claim 1 wherein said positioning means for positioning a preselected portion of said contact material in mutual alignment with said predetermined area on said strip comprises an intermittently activated drive means drivably affixed to said supply means for supplying said contact material.

7. The apparatus according to claim 1 wherein said welding means for welding said preselected portion of said contact material to said predetermined area on said strip comprises a welding assembly including a pair of opposed electrodes, a first of said electrodes for engaging said preselected portion of said contact material and a second of said electrodes for engaging said metal strip.

8. The apparatus according to claim 7 wherein said first electrode is movable and said second electrode is stationary and adpated for having said metal strip pass thereover.

9. The apparatus according to claim 1 further including a removal means for removing preselected areas of said metal strip prior to welding said preselected portion of said contact material to said predetermined area on said metal strip.

10. The apparatus according to claim 1 further including means for coining said metal strip prior to welding said preselected portion of said contact material to said predetermined area on said metal strip.

* * * * *

UNITED STATES PATENT AND TRADEMARK OFFICE
CERTIFICATE OF CORRECTION

PATENT NO. : 3,974,954
DATED : August 17, 1976
INVENTOR(S) : Robert R. Brenan and Gordon L. Johnson It is certified that error appears in the above-identified patent and that said Letters Patent are hereby corrected as shown below:

Col. 2, line 5 - Please delete "area. contact" and insert -- areas --.

Col. 2, line 14 - Please delete "contaact" and insert -- contact --.

Col. 6, line 1 - Please delete "desired undesirable" and insert -- described undesirable --.

Col. 7, line 18- Please delete "strip having" and insert -- strip and having --.

Col. 7, line 49- Please delete "be engagement" and insert -- be in engagement --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*